(12) United States Patent
Sullivan et al.

(10) Patent No.: US 7,716,315 B2
(45) Date of Patent: May 11, 2010

(54) ENCLOSURE CONFIGURABLE TO PERFORM IN-BAND OR OUT-OF-BAND ENCLOSURE MANAGEMENT

(75) Inventors: Douglas R. Sullivan, Hopkinton, MA (US); Steven D. Sardella, Marlboro, MA (US); Robert P. Valentine, Auburn, MA (US)

(73) Assignee: EMC Corporation, Hopkinton, MA (US)

( * ) Notice: Subject to any disclaimer, the term of this patent is extended or adjusted under 35 U.S.C. 154(b) by 1312 days.

(21) Appl. No.: 10/949,852

(22) Filed: Sep. 24, 2004

(65) Prior Publication Data

US 2006/0074927 A1    Apr. 6, 2006

(51) Int. Cl.
*G06F 15/173*    (2006.01)
*G06F 13/00*    (2006.01)

(52) U.S. Cl. .................................... 709/223; 710/104
(58) Field of Classification Search ......... 709/208–211, 709/220–229; 700/104
See application file for complete search history.

(56) References Cited

U.S. PATENT DOCUMENTS

| | | | |
|---|---|---|---|
| 5,835,566 A | 11/1998 | Cowgill | |
| 6,519,663 B1 | 2/2003 | Osten et al. | |
| 6,826,714 B2 | 11/2004 | Coffey et al. | |
| 6,981,094 B2 * | 12/2005 | Nonaka et al. | 711/114 |
| 6,990,553 B2 * | 1/2006 | Nakayama et al. | 711/114 |
| 7,127,798 B1 * | 10/2006 | Reger et al. | 29/603.03 |
| 7,136,962 B2 * | 11/2006 | Sugimoto | 711/112 |
| 7,263,108 B2 * | 8/2007 | Kizhepat | 370/473 |
| 7,516,537 B1 * | 4/2009 | Reger et al. | 29/603.04 |
| 2002/0004912 A1 * | 1/2002 | Fung | 713/300 |
| 2003/0135674 A1 | 7/2003 | Mason, Jr. et al. | |
| 2004/0054780 A1 * | 3/2004 | Romero | 709/226 |
| 2004/0190545 A1 | 9/2004 | Reid et al. | |
| 2005/0114615 A1 * | 5/2005 | Ogasawara et al. | 711/162 |
| 2005/0188060 A1 * | 8/2005 | Meneghini et al. | 709/220 |
| 2005/0246568 A1 * | 11/2005 | Davies | 714/2 |

* cited by examiner

*Primary Examiner*—Paul H Kang
*Assistant Examiner*—Shirley X Zhang
(74) *Attorney, Agent, or Firm*—Guerin & Rodriguez, LLP; Michael A. Rodriguez (57) ABSTRACT

Described is an enclosure that is configurable to perform either in-band or out-of-band enclosure management. The enclosure includes a midplane, a processor blade, and a management module. The processor blade has program code for collecting management information from other components in the enclosure. If the enclosure is configured for in-band enclosure management, the processor blade executes the program code to collect the management information. If the enclosure is configured for out-of-band enclosure management, the management module is configured to execute program code for collecting the management information instead of the processor blade.

17 Claims, 7 Drawing Sheets

ENCLOSURE CONFIGURABLE TO PERFORM IN-BAND OR OUT-OF-BAND ENCLOSURE MANAGEMENT

FIELD OF THE INVENTION

The invention relates generally to management data collection in systems. More particularly, the invention relates to enclosures that are configurable to perform either in-band or out-of-band enclosure management.

BACKGROUND

Network-attached storage (NAS) and storage-area networks (SAN) are widely used applications for storage enclosures. A storage enclosure deployed in a NAS system functions as a node (or server) directly attached to the network (e.g., a LAN) and dedicated to file sharing. A NAS head device operates as an interface between clients on the network and the devices storing the data. The NAS appears on the network as a single node having the IP address of the NAS head device, and clients generally access the NAS head over an Ethernet connection. In contrast, a SAN is a dedicated network of shared storage devices separate from the client network (e.g., the LAN). The Fibre Channel protocol interconnects these storage devices, from which clients access data in blocks.

Important to the reliable operation of NAS and SAN storage systems is the ability to monitor and control the storage enclosures remotely. Enclosure management is the process of gathering information regarding the operating status of the enclosures within the storage system. Such information includes the temperature of the enclosure, fan speed, and the operational status of the power supplies, of the interconnections between the various components of the enclosure, and of the enclosure cards. Managers of a storage system can access this management information remotely from an external entity, e.g., a remote host computer.

Storage enclosures can gather management information in one of two ways: "in-band" and "out-of-band." In-band enclosure management employs a storage processor to collect the management information for reporting to the remote host. This management technique relies on the storage processor to be operational. Failure of the storage processor negatively affects enclosure management. For out-of-band enclosure management, a separate component in the enclosure other than the storage processor collects and forwards the management information to the remote host. This technique removes this reliance on the storage processor to be operational for enclosure management.

The manner in which a storage enclosure collects management information can depend upon the particular application of the enclosure. For example, a supplier of storage products can configure its NAS enclosures to perform out-of-band enclosure management and its SAN enclosures to perform in-band enclosure management. Because NAS uses different hardware and software than SAN and out-of-band management functionality requires different hardware and software components than in-band management, often NAS enclosures differ significantly in shape, size, and content from SAN enclosures. To support both types of enclosure management, this supplier of storage products would need to manage different sets of chassis and component inventories for the different enclosure types. Costs are thus higher to support the separate enclosure types.

SUMMARY

In one aspect, the invention features an enclosure configurable to perform one of in-band enclosure management and out-of-band enclosure management. The enclosure includes a midplane, a processor module connected to the midplane, and a management module. The processor module has program code for collecting management information from other components in the enclosure. If the enclosure is configured for in-band enclosure management, the processor module executes the program code to collect the management information. If the enclosure is configured for out-of-band enclosure management, the management module is configured to execute program code for collecting management information instead of the processor module.

In another aspect, the invention features a method of configuring an enclosure for performing one of in-band enclosure management and out-of-band enclosure management. A processor module of the enclosure is provided with program code for collecting management information from other components in the enclosure. The program code is executed on the processor module if the enclosure is configured for in-band enclosure management. Otherwise, if the enclosure is configured for out-of-band enclosure management, program code is executed on a management module of the enclosure to collect the management information instead of the processor module.

In still another aspect, the invention features a method of constructing an enclosure configured to perform in-band enclosure management and out-of-band enclosure management. A chassis is provided for the enclosure. A midplane is installed in the chassis. A processor module is connected to the midplane. The processor module has program code for collecting management information from other components in the enclosure if the program code is executed. A management module is connected to the midplane. The management module has a microcontroller for collecting management information from other components in the enclosure if the enclosure is to be configured for out-of-band enclosure management. If the enclosure is to be configured for in-band enclosure management, the management module without the microcontroller that is used for collecting management information is connected to the midplane.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention relates to a system architecture for management data collection in enclosures. Enclosures constructed in accordance with this system architecture are configurable to perform either in-band or out-of-band enclosure management, depending upon the particular hardware and software components deployed in the enclosure. In the present invention, certain enclosure components, such as the I/O modules, management modules, firmware, and operating environment software (e.g., DART™ and FLARE™), differentiate between enclosures configured for in-band from those configured for out-of-band enclosure management. Other hardware and software components are common to both in-band and out-of-band storage enclosures, including the midplane, power supplies, blower modules, CPU (or processor) modules, BIOS (basic input/output system), and POST (power-on self-test). Further, the same chassis for constructing in-band enclosures can also serve in constructing out-of-band enclosures. These common components give a measure of flexibility to a manufacturer or supplier of storage enclosures of the invention: the manufacturer can use these components to support orders for both NAS and SAN enclosures.

Figure 1:
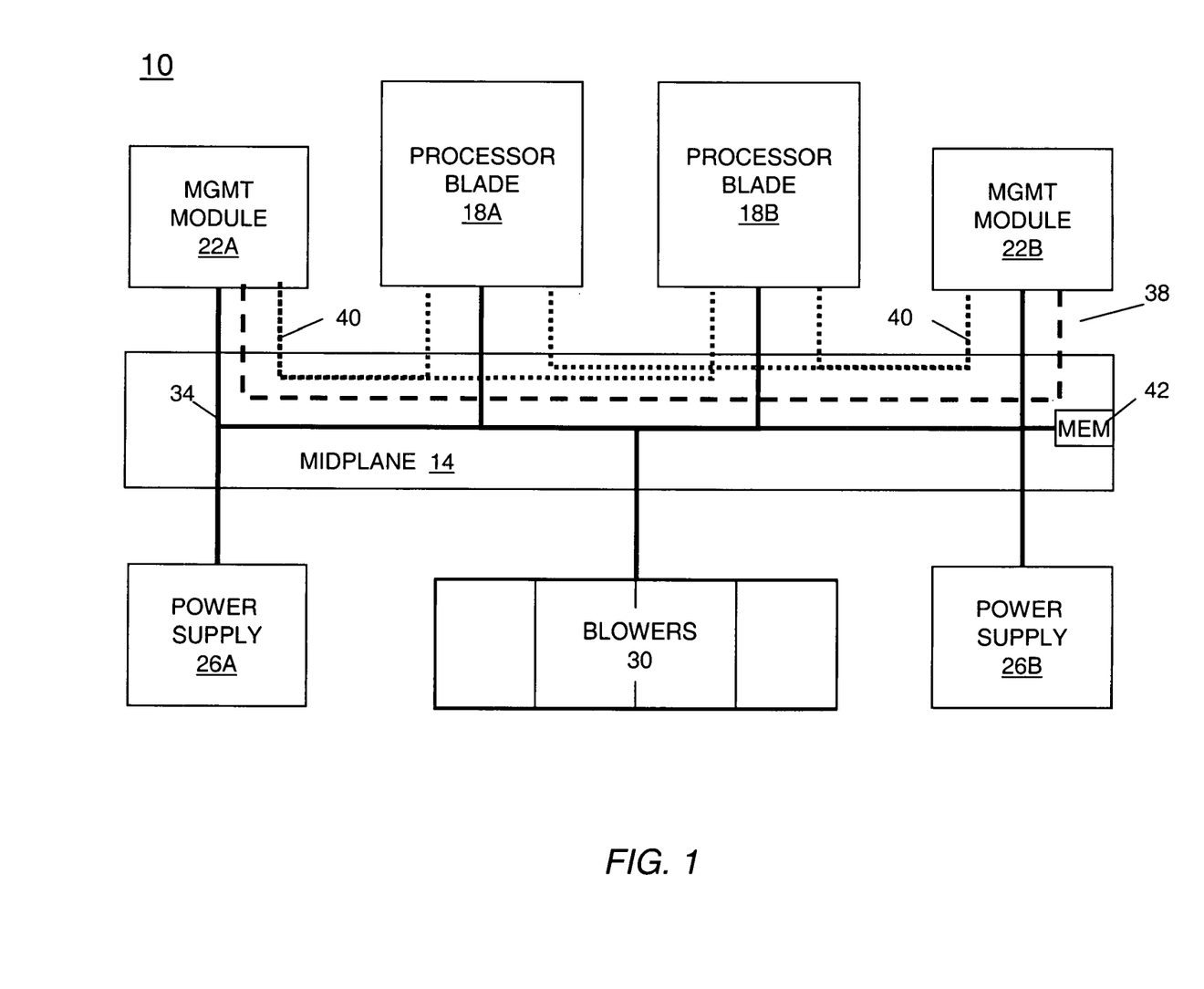
FIG. 1 is a functional block diagram of an embodiment of a storage enclosure of the invention.

FIG. 1 shows a system block diagram of an embodiment of a storage enclosure 10 of the invention, including a midplane 14, redundant processor blades 18A, 18B (generally, processor blade 18), management modules 22A, 22B (generally, management module 22), redundant power supplies 26A, 26B, and fans or blowers 30.

The storage enclosure 10 is configurable for use in either a NAS or a SAN system. Throughout this description, for purposes of illustrating the invention, NAS storage enclosures are configured to perform out-of-band enclosure management, and SAN storage enclosures to perform in-band enclosure management. It is to be understood, however, that the opposite configurations can be implemented, i.e., NAS for in-band management and SAN for out-of-band management, without departing from the principles of the invention.

The midplane 14 includes a plurality of electrical signal lines 34, 38, 40 for interconnecting the processor blades 18, the management modules 22, the power supplies 26, and the blowers 30. Signal lines 34 are buses for conveying management information. In one embodiment, these signal lines 34 are redundant I²C busses. For a SAN enclosure, the processor blades 18 collect management information over these signal lines 34 from each other, from the power supplies 26, and from the blowers 30. For a NAS enclosure, the redundant management modules 22 communicate over these signal lines 34 to collect management information from the processor blades 18, power supplies 26, and blowers 30.

NAS enclosures also use signal lines 38 for communication between the management modules 22A, 22B. Over these signal lines 38, the management modules 22A, 22B communicate with each other to determine that the other is still functioning properly. In one embodiment, this communication over the signal lines 38 between the management modules 22A, 22B occurs in accordance with the RS-232 protocol. For a SAN enclosure, the signal lines 38 on the midplane 14 are unused.

The signal lines 40 provide access to the processor blades 18. For a SAN enclosure, an external host computer can communicate with the processor blades 18 through the management modules 22 over these signal lines 40 to obtain the management information collected by the processor blades 18. For a NAS enclosure, the management modules 22 communicate with the processor blades 18. Communication over the signal lines 40 occurs in accordance with the Ethernet protocol.

The midplane 14 also has persistent memory 42 (e.g., a programmable read-only memory or PROM) mounted thereon. Stored in the memory 42 is an identifier for indicating the type of storage application (i.e., NAS or SAN) for which the enclosure 10 is configured. If the identifier indicates that the configuration of the enclosure 10 is for a SAN enclosure, then the processor blades 18 collect management information from the other components in the enclosure. If the identifier indicates that the enclosure 10 is a NAS enclosure, the management modules 22 are responsible for collecting the management information, and the processor blades 18 do not.

Upon initialization or re-initialization of the enclosure 10, each processor blade 18 accesses the memory 42 to determine the particular configuration and its particular role in enclosure management. If one or both of the processor blades are unable to determine the configuration of the enclosure 10 from the memory 42, that processor blade uses a "last known good copy" of the configuration identifier, which is stored locally on that processor blade. Management modules 22 configured for NAS enclosures can also access the memory 42 to determine whether that module is properly installed in a NAS enclosure (i.e., and not in a SAN enclosure). Likewise, these management modules 22 can use a last known good copy stored on that module if unable to determine the type of configuration from the memory 42. Management modules 22 configured for SAN enclosures do not have the capability of collecting management information or of accessing the memory 42.

In general, the processor blades 18 handle I/O requests for obtaining customer data. Redundancy enables one processor blade 18, acting as the backup, to assume control should the primary processor blade fail. Each processor blade 18 is a combination of a CPU (or processor) module and one or more I/O modules. In a SAN enclosure, each processor blade 18 can be referred to as a storage processor or a SAN blade, and in a NAS enclosure, each processor blade 18 can be referred to as a data mover or a NAS blade. Implementations of I/O modules differ depending upon whether the configuration of the enclosure 10 is for NAS or for SAN, whereas the hardware and software of the processor blade are the same regardless of the particular enclosure configuration. The processor blade has program code that performs enclosure management (i.e., in-band) when executed. Execution of this program code depends upon the enclosure configuration. If the configuration of the enclosure 10 is for SAN, the processor blade executes the program code; otherwise, if the configuration is for NAS, the program code remains unexecuted (i.e., the processor blade has a capability unused in NAS).

The implementation of the management modules 22 also depends upon the configuration of the enclosure 10. If the configuration of the enclosure 10 is for NAS, the management modules 22 include circuitry and program code for performing out-of-band enclosure management, as described in more detail in FIG. 4. Otherwise, if the enclosure configuration is for SAN, the management modules 22 do not have such circuitry and program code, because the processor blades 18 have the task of enclosure management.

Figure 2:
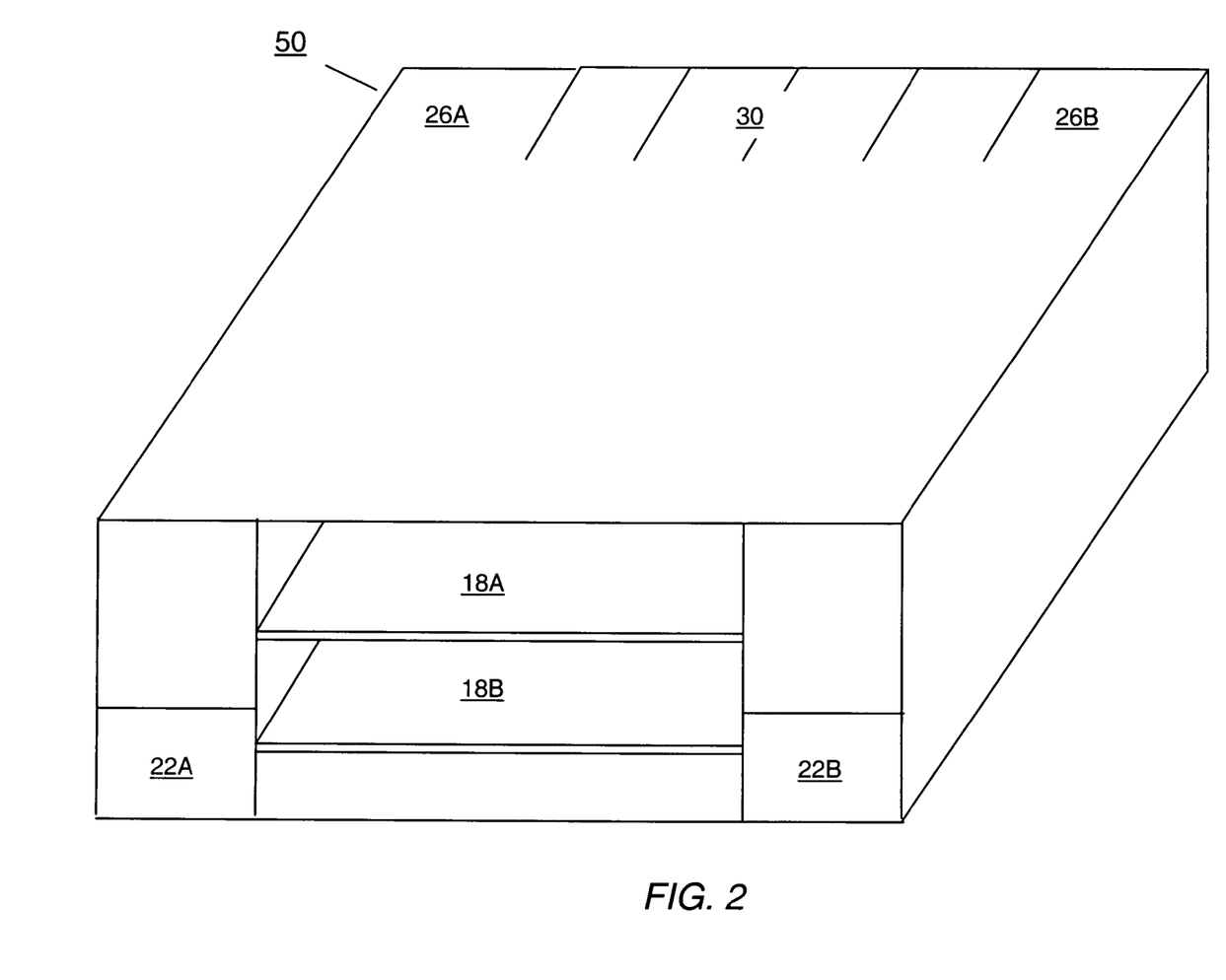
FIG. 2 is an isometric view of an embodiment of the storage enclosure of FIG. 1.

In FIG. 2, a simplified view of the enclosure 10 illustrates one exemplary arrangement of the various modules within a rack mountable enclosure chassis 50. In one embodiment, the enclosure chassis 50 is 4 U in height and 28 inches in length. Housed within the chassis 50 are the processor blades 18, management modules 22, power supplies 26, and blower modules 30. Here, each management module 22, power supply 26, and blower module 30 is a field replaceable units or FRU. A field replaceable unit means that service personnel can replace that component manually without the use of tools. In the embodiment shown, field service personnel can remove and replace the power supplies 26 and blowers 30 from the rear side of the enclosure 10 and the management modules 22 from the front side.

Figure 3:
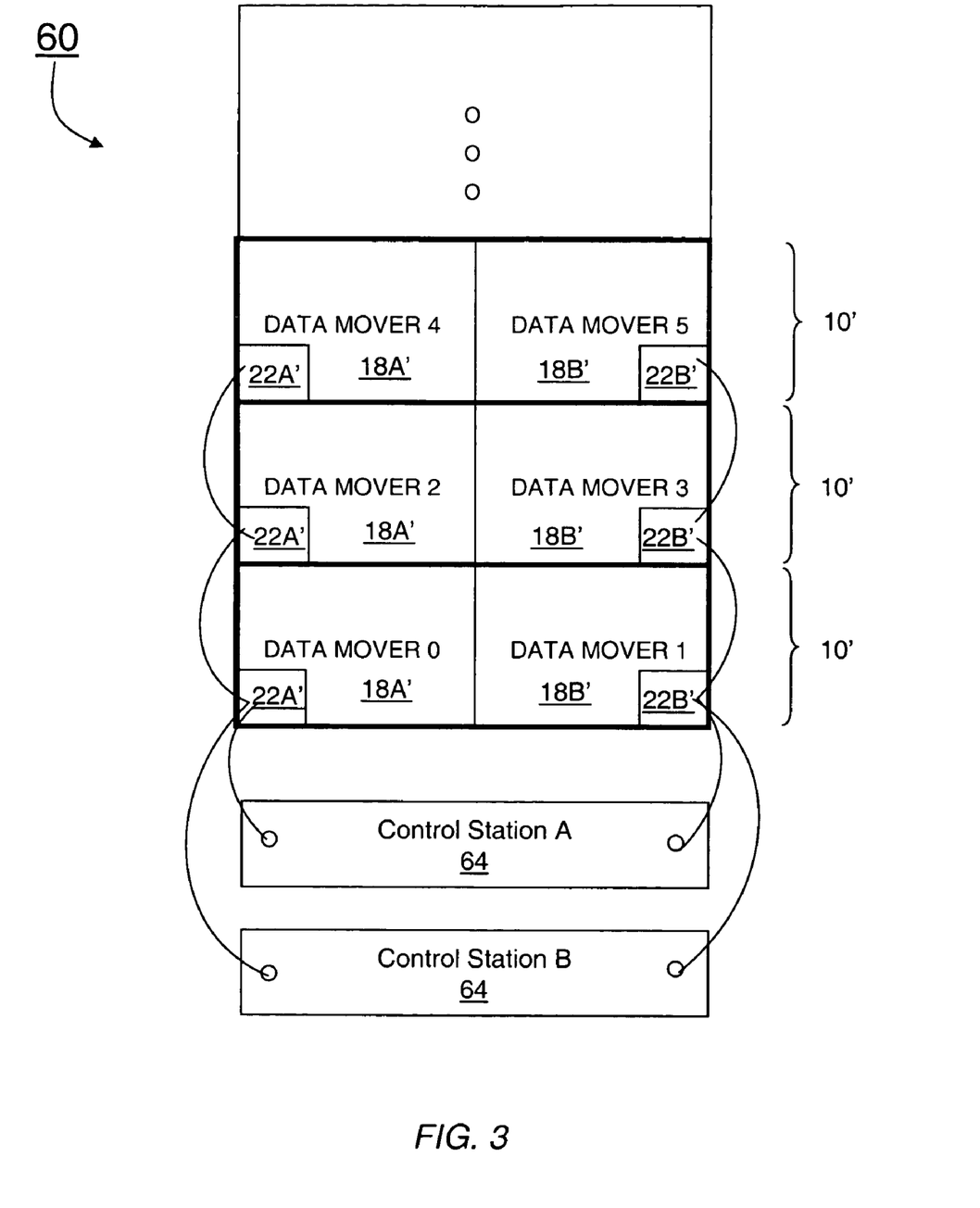
FIG. 3 is an embodiment of a Network-Attached Storage (NAS) system constructed in accordance with the invention.

FIG. 3 shows an example of a NAS system 60 having a plurality of storage enclosures 10' (here, referred to as data mover enclosures 10') of the invention. The NAS system 60 also includes a plurality of redundant control stations 64 (i.e., a primary and a backup) that are in communication with each of the data mover enclosures 10' in daisy-chain fashion. Each data mover enclosure 10' includes a pair of redundant data movers 18A', 18B' (i.e., processor blades). The primary control station 64 is also responsible for collecting the management information from each of the enclosures 10' in the system 60. Each control station 64 has an Ethernet port for making a connection to an external network and a plurality of Ethernet ports for making redundant connections to a data mover enclosure 10' in the NAS system 60.

The NAS system 60 further includes management modules 22A', 22B' (generally, NAS management module 22') configured to perform out-of-band enclosure management. Although each storage enclosure 10' in this embodiment has dual data movers, an enclosure with a single data mover can also practice the invention. Embodiments of enclosures 10' with one data mover only, e.g., 18A', have two management modules 22A', 22B' to provide redundancy for the collection of management information and redundant management paths to the control stations 64.

Figure 4:
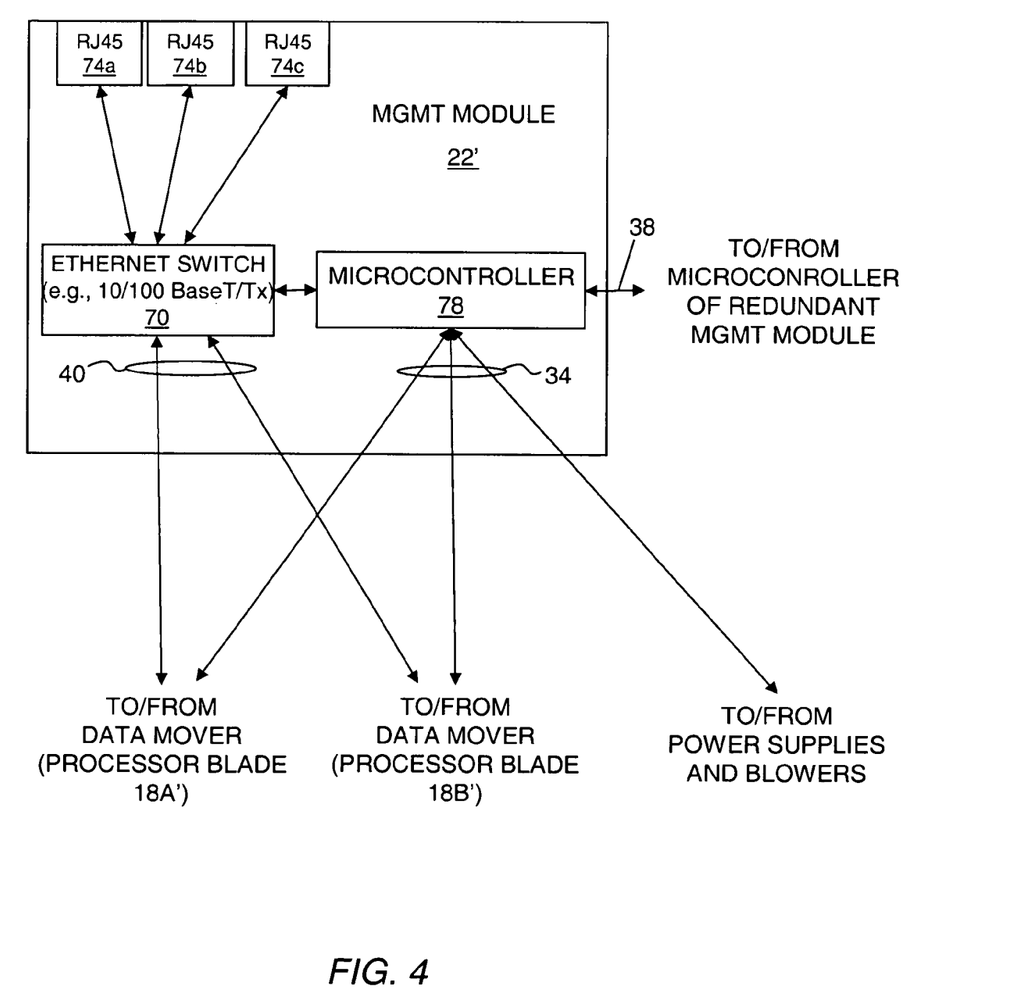
FIG. 4 is a functional block diagram of an embodiment of a NAS management module adapted for out-of-band enclosure management.

Referring now also to FIG. 4, each NAS management module 22' includes a multi-port Ethernet switch 70 in communication with a plurality of connection ports 74a, 74b, 74c (generally, port 74), with a microcontroller 78, and with the data movers 18A', 18B' (generally, data movers 18'). In one embodiment, the connection ports 74 are RJ-45 connectors. These connectors 74 support daisy chaining of an Ethernet management network between the control stations 64 and the data mover enclosures 10' as shown in FIG. 3.

The Ethernet switch 70 and connection ports 74 give external management access to the microcontroller 78 within the enclosure 10' (where program code running on the microcontroller 78 performs enclosure management). The Ethernet switch 70 provides connections for the management microcontroller 78 to the processor blades 18 (over signal lines 40). In one embodiment, the Ethernet switch is implemented by a Broadcom BCM5325 10/100 BaseT/TX Ethernet switch six-port device, and the microcontroller 78 by a Motorola MCF5282 device.

In this embodiment, the NAS management module 22' performs out-of-band enclosure management. Firmware executing on the microcontroller 78 performs some of the enclosure management tasks autonomously and others enclosure management tasks on behalf of the control stations 64. When the data mover enclosure 10' employs redundant management modules 22', the microcontroller 78 of the management module 22A' is in communication with the microcontroller of the other management module 22B' (not shown) over the signal lines 38 (FIG. 1) to monitor the functionality of the other module. The management modules 22' also communicate with the primary control station 64 to send collected management information to that control station 64. If one of the management modules 22' fails or is removed, the remaining management module 22" is capable of managing the resources of the enclosure 10' (i.e., both data movers, both power supplies, and the blowers).

Figure 5:
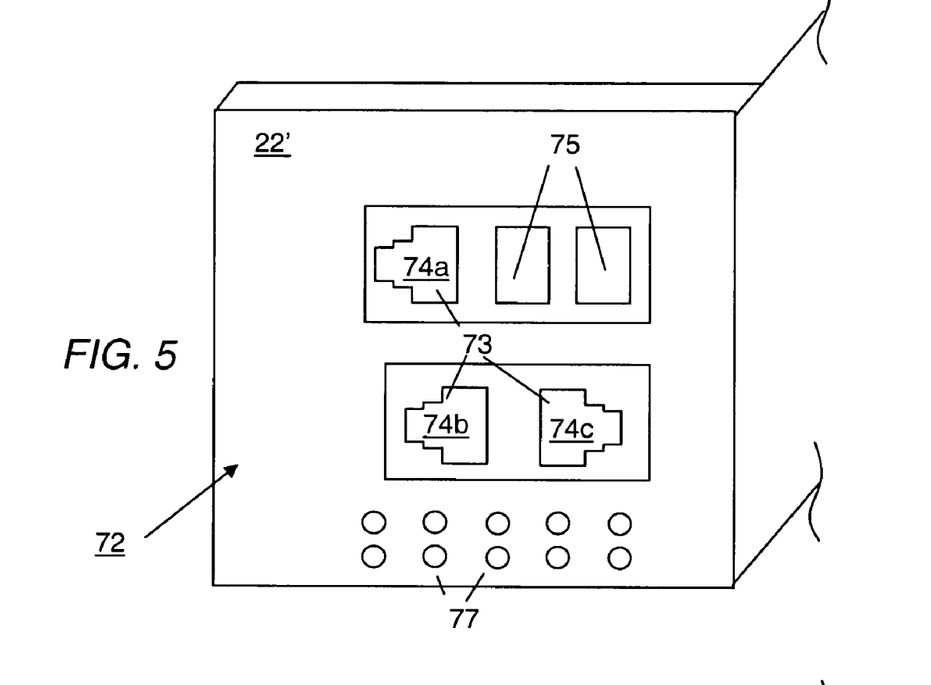
FIG. 5 is a front-panel view of the NAS management module of FIG. 4.

FIG. 5 shows an embodiment of a front panel 72 for the NAS management module 22'. The front panel 72 includes jacks 73 (corresponding to the connection ports 74a, 74b, and 74c) for interconnecting the NAS management module 22' to the redundant control stations 64 and to another NAS management module. The front panel 72 also has jacks 75 for serial ports and LEDs 77 to show the fault status, power status, and operational status of the enclosures in the NAS system 60.

Figure 6:
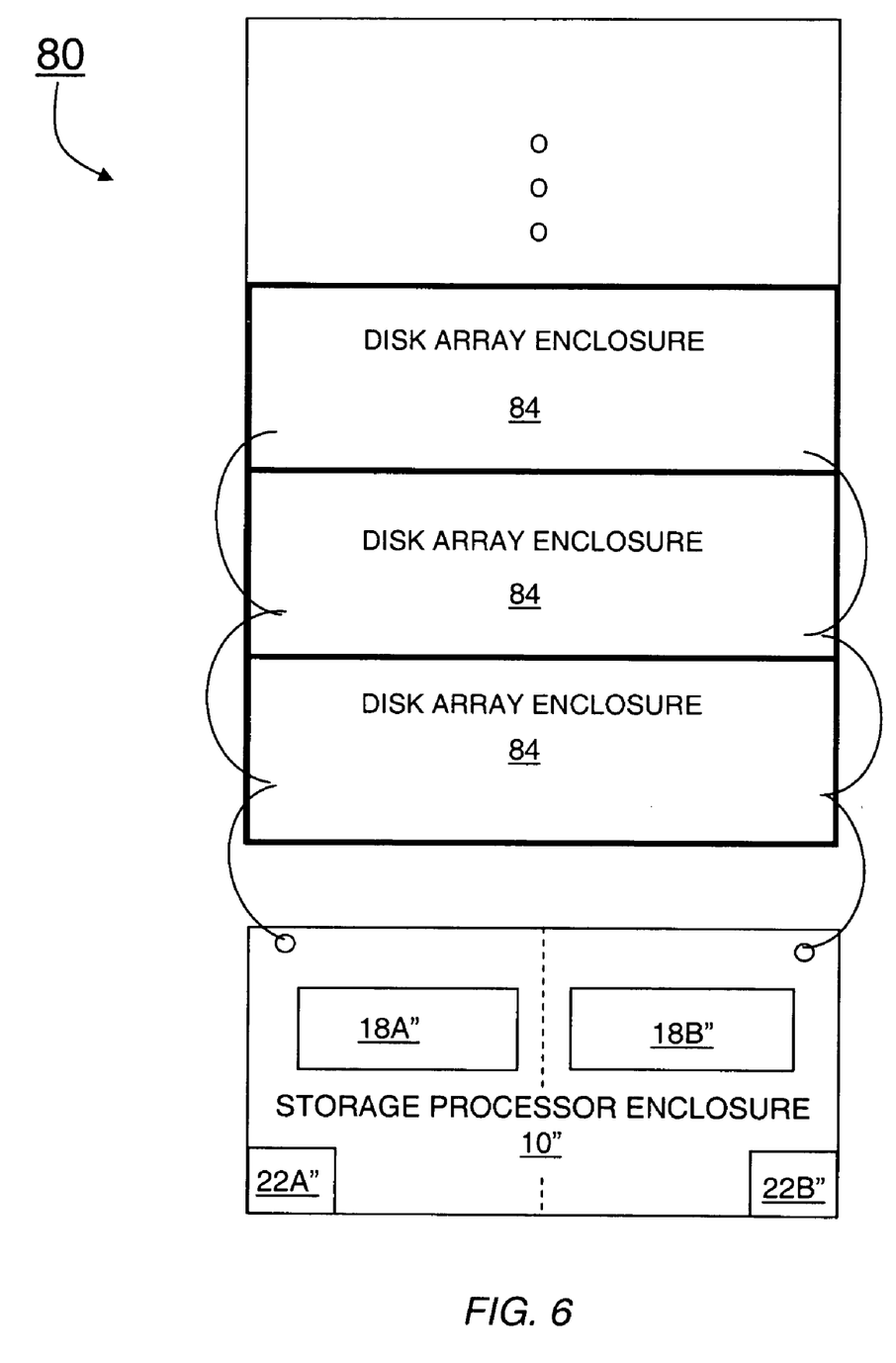
FIG. 6 is an embodiment of a Storage-Area Network (SAN) system constructed in accordance with the invention.

FIG. 6 shows an example of a SAN system 80 having a storage enclosure 10" of the invention (here, referred to as a storage processor enclosure). The SAN system 80 also includes a plurality of disk array enclosures 84 with which the storage processor enclosure 10" is in communication in daisy-chain fashion. The storage processor enclosure 10" includes redundant processor blades 18A", 18B" and redundant management modules 22A", 22B". In accordance with the invention, the storage processor blades 18A", 18B" perform in-band enclosure management.

Figure 7:
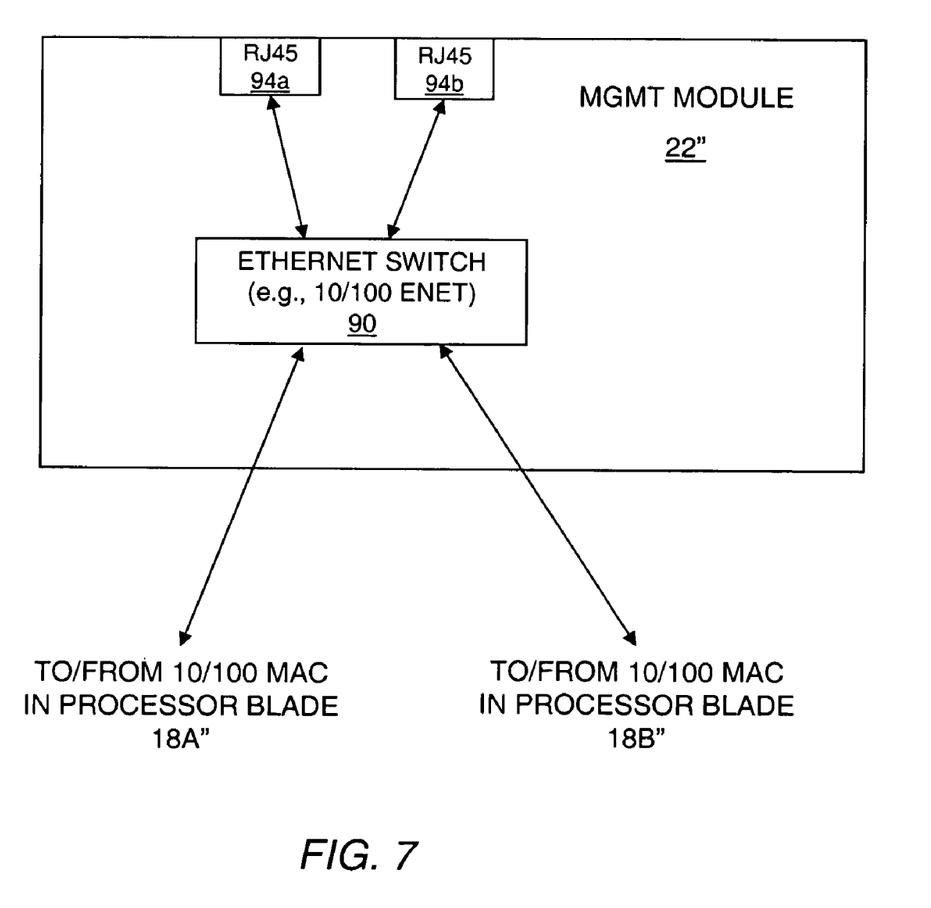
FIG. 7 is a functional block diagram of an embodiment of a SAN management module adapted for in-band enclosure management.

FIG. 7 shows an embodiment of a SAN management module 22" in an enclosure 10" configured for in-band enclosure management. The SAN management module 22" includes a multi-port Ethernet switch 90 in communication with a plurality of LAN connection ports 94a, 94b (here, e.g., RJ45 ports) and with the processor blades 18A", 18B" (generally, processor blades 18"). The Ethernet switch 90 can be implemented with a Broadcom BCM5325M 10/100Base-TS six-port device. The LAN connection ports 94a, 94b enable external management to access the processor blades 18" within the storage processor enclosure 10" (where software running on the processor blades 18" performs in-band enclosure management). One of the LAN connection ports can be for connection to the client network and the other LAN connection for providing a direct connection to the system (e.g., a laptop computer of field service personnel). Separation thus comes about between the client network and the field service network.

Figure 8:
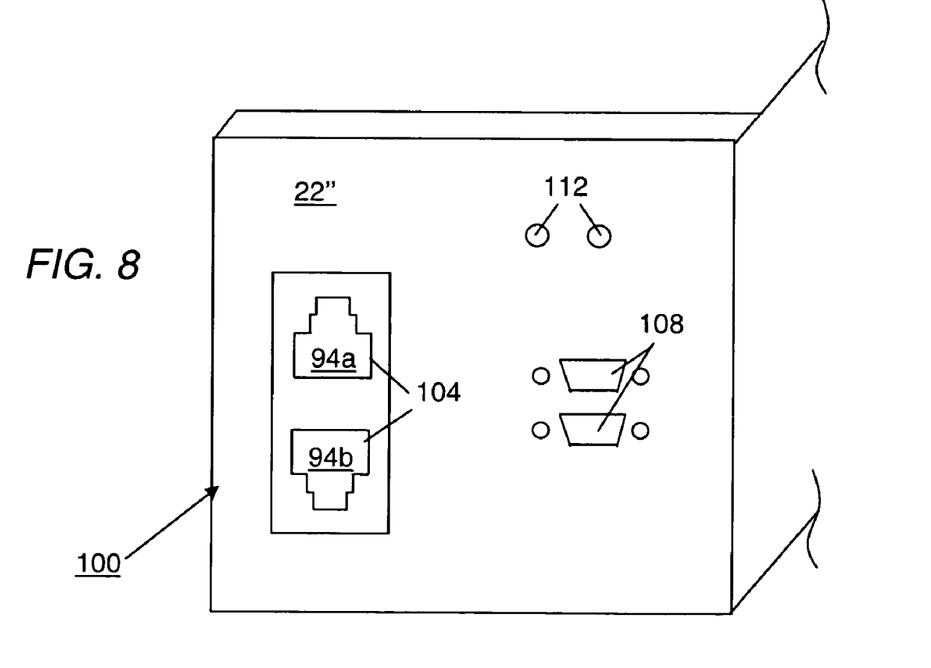
FIG. 8 is a front-panel view of the SAN management module of FIG. 7.

FIG. 8 shows an embodiment of a front panel 100 for the SAN management module 22". The front panel 100 includes jacks 104 (corresponding to the connection ports 94a and 94b) for receiving cabling that can be used to connect the SAN management module 22" to an external network and to a local computer. The front panel 100 also has jacks 108 for serial ports and LEDs 112 to show fault and power status.

While the invention has been shown and described with reference to specific preferred embodiments, it should be understood by those skilled in the art that various changes in form and detail may be made therein without departing from the spirit and scope of the invention as defined by the following claims. For example, it is to be understood that the storage enclosures described herein are specific embodiments of the invention and that the invention can be embodied in any type of enclosure (i.e., other than a storage enclosure) having one processor blade and one management module. Further, although the specific embodiments primarily described herein have two processor blades and two management modules, other embodiments of the invention can have any number of either type of module (i.e., one, two, or more processor blades and one, two, or more management modules).

What is claimed is:

1. An enclosure configurable to perform one of in-band enclosure management and out-of-band enclosure management, the enclosure comprising:
   a midplane;
   memory, connected to the midplane, storing an identifier used to determine a manner in which the enclosure collects management information, wherein the collecting of management information entails gathering information about operating status of other components in the enclosure, the identifier being set to indicate one of two different storage configurations, the identifier indicating that the enclosure collects management information through out-of-band enclosure management when set to indicate a first one of the two storage configurations and indicating that the enclosure collects management information through in-band enclosure management when set to indicate a second one of the two storage configurations;
   a processor blade and a management module both connected to the midplane, one of the processor blade and management module collecting management information from other components in the enclosure whereas the other of the processor blade and management module does not, which one of the processor blade and the management module collects the management information depending on the manner in which the enclosure collects management information as determined from the identifier stored in memory;
   the processor blade having program code for collecting the management information from other components in the enclosure, the processor blade being configured to read the identifier stored in the memory, the processor blade executing the program code to collect the management information from other components in the enclosure if the identifier stored in the memory indicates that the manner in which the enclosure collects management information is through in-band enclosure management; and
   the management module being configured to execute program code for collecting the management information from other components in the enclosure if the identifier stored in the memory indicates that the manner in which the enclosure collects management information is through out-of-band enclosure management.

2. The enclosure of claim 1, wherein the enclosure is configured for out-of-band enclosure management and the management module includes a microcontroller for executing program code on the management module to collect the management information.

3. The enclosure of claim 2, wherein the management module includes a network connection port and an Ethernet switch in communication with the microcontroller and with the network connection port, the network connection port and the Ethernet switch providing a communications path by which a remote host can access the management information collected by the microcontroller.

4. The enclosure of claim 2, further comprising a second management module having a second microcontroller, the second microcontroller of the second management module communicating with the microcontroller of the other management module.

5. The enclosure of claim 2, wherein the enclosure operates as a Network-Attached Storage (NAS) data mover enclosure.

6. The enclosure of claim 1, wherein the enclosure is configured for in-band enclosure management and the management module includes a network connection port and an Ethernet switch in communication with the network connection port, the network connection port and the Ethernet switch providing a communications path by which a remote host can access the management information collected by the processor blade.

7. The enclosure of claim 6, wherein the enclosure operates as a storage processor in a Storage-Area Network (SAN).

8. The enclosure of claim 1, wherein the management module is a field replaceable unit.

9. A method of configuring an enclosure for performing one of in-band enclosure management and out-of-band enclosure management, the method comprising:
   providing a management module in the enclosure;
   storing in memory an identifier used to determine a manner in which the enclosure collects management information, wherein the collecting of management information entails gathering information about operating status of other components in the enclosure;
   setting the identifier to indicate one of two different storage configurations, the identifier indicating that the enclosure collects management information through out-of-band enclosure management when set to indicate a first one of the two storage configurations and indicating that the enclosure collects management information through in-band enclosure management when set to indicate a second one of the two storage configurations;
   reading from the memory, by a processor blade of the enclosure, the identifier used to determine a manner in which the enclosure collects management information;
   providing the processor blade of the enclosure with program code for collecting management information from other components in the enclosure, one of the processor blade and management module collecting management information from other components in the enclosure whereas the other of the processor blade and management module does not, which one of the processor blade and the management module collects the management information depending on the manner in which the enclosure collects management information as determined from the identifier stored in memory; and
   executing the program code on the processor blade to collect management information from other components in the enclosure if the processor blade determines from the identifier that the manner in which the enclosure collects management information is through in-band enclosure management,
   otherwise executing program code on the management module of the enclosure, instead of the program code on the processor blade, to collect the management information from other components in the enclosure if the processor blade determines from the identifier that the manner in which the enclosure collects management information is through out-of-band enclosure management.

10. The method of claim 9, further comprising reading the identifier from the memory by the management module to determine whether the management module has been installed in a Network-Attached Storage enclosure.

11. The method of claim 9, further comprising operating the enclosure as a Network-Attached Storage (NAS) data mover enclosure.

12. The method of claim 9, further comprising operating the enclosure as a storage processor in a Storage-Area Network (SAN).

13. A method of constructing an enclosure for performing one of in-band enclosure management and out-of-band enclosure management, wherein enclosure management entails gathering information about operating status of other components in the enclosure the method comprising:

providing a chassis for the enclosure;

installing a midplane in the chassis, the midplane having memory connected thereto storing an identifier used to determine a manner in which the enclosure is to collect management information, wherein the manner in which the enclosure is to collect management information determines a configuration of management module to be installed in the enclosure;

setting the identifier to indicate one of two different storage configurations, the identifier indicating that the enclosure collects management information through out-of-band enclosure management when set to indicate a first one of the two storage configurations and indicating that the enclosure collects management information through in-band enclosure management when set to indicate a second one of the two storage configurations;

connecting to the midplane a processor blade having program code for collecting management information from other components in the enclosure if the program code is executed, the processor blade reading the identifier stored in the memory, the processor blade executing the program code to collect the management information from the other components in the enclosure if the identifier stored in the memory determines that the manner in which the enclosure is to collect management information is through in-band enclosure management; and connecting to the midplane a management module having a microcontroller for collecting management information from other components in the enclosure instead of the processor blade if the manner in which the enclosure is to collect management information is through out-of-band enclosure management, otherwise if the enclosure is to collect management information through in-band enclosure management, connecting to the midplane a management module that lacks the microcontroller.

14. The method of claim 13, wherein, if the manner in which the enclosure is to collect management information is through out-of-band enclosure management, the enclosure is a Network-Attached Storage (NAS) data mover enclosure.

15. The method of claim 13, wherein, if the manner in which the enclosure is to collect management information is through in-band enclosure management, the enclosure is a storage processor in a Storage-Area Network (SAN).

16. The method of claim 9, further comprising storing a copy of the identifier in memory of the processor blade, and wherein the step of reading the identifier from memory includes reading the copy of the identifier stored in the memory of the processor blade.

17. The method of claim 10, further comprising storing a copy of the identifier in memory of the management module, and wherein the step of reading the identifier from memory includes reading the copy of the identifier stored in the memory of the management module.

* * * * *